(12) United States Patent
Miyata et al.

(10) Patent No.: US 7,419,448 B2
(45) Date of Patent: Sep. 2, 2008

(54) DRIVE BELT PULLEY AND BELT DRIVE SYSTEM

(75) Inventors: Hirofumi Miyata, Hyogo (JP); Shinichiro Nishikawa, Hyogo (JP); Masashi Yoshimura, Hyogo (JP)

(73) Assignee: Bando Chemical Industries, Ltd., Hyogo (JP)

(*) Notice: Subject to any disclaimer, the term of this patent is extended or adjusted under 35 U.S.C. 154(b) by 542 days.

(21) Appl. No.: 10/944,756

(22) Filed: Sep. 21, 2004

(65) Prior Publication Data

US 2005/0070388 A1 Mar. 31, 2005

(30) Foreign Application Priority Data

Sep. 26, 2003 (JP) ............... 2003-335697
Mar. 3, 2004 (JP) ............... 2004-058632

(51) Int. Cl.
*F16H 7/12* (2006.01)
*F16H 7/20* (2006.01)
*F16H 55/36* (2006.01)

(52) U.S. Cl. ............... 474/199; 474/118; 474/139

(58) Field of Classification Search ............... 474/101, 474/117, 123, 133, 135, 148, 166, 197, 181–183, 474/902, 139; 245/398; 198/806, 835; 384/547, 384/598; 74/421 R
See application file for complete search history.

(56) References Cited

U.S. PATENT DOCUMENTS

| | | | |
|---|---|---|---|
| 526,013 A * | 9/1894 | Howard | 384/547 |
| 1,454,657 A * | 5/1923 | Smith | 464/125 |
| 2,279,887 A * | 4/1942 | Hathorn | 254/398 |
| 2,421,685 A * | 6/1947 | Crot et al. | 384/498 |
| 3,251,235 A * | 5/1966 | Cederberg et al. | 474/123 |
| 3,959,899 A * | 6/1976 | Rangaswamy | 37/397 |
| 4,372,435 A * | 2/1983 | Bradbury | 198/369.4 |
| 4,537,581 A * | 8/1985 | Johansson et al. | 474/123 |

(Continued)

FOREIGN PATENT DOCUMENTS

| | | |
|---|---|---|
| DE | 100 35 488 A1 | 1/2002 |
| GB | 1 218 197 | 1/1971 |
| JP | 59-45351 | 3/1984 |
| JP | 63-006520 | 2/1988 |
| JP | 06-307521 A | 11/1994 |

OTHER PUBLICATIONS

Specification and Drawings for U.S. Appl. No. 10/875,296 filed Jun. 25, 2004.
European Search Report dated Nov. 16, 2004 for Application No. EP 04 02 2536.

*Primary Examiner*—Marcus Charles
(74) *Attorney, Agent, or Firm*—Studebaker & Brackett PC; Donald R. Studebaker (57) ABSTRACT

A hollow cylindrical pulley body 5 is carried rotatably by a hollow cylindrical shaft member 11. A support rod 8 is inserted in the shaft member 11 to support the shaft member 11 for rocking motion about a pivot axis C2 orthogonal to the shaft member 11. The pivot axis C2 is inclined backward in the direction of belt travel with respect to the direction of load on the shaft member 11. With this configuration, when the drive belt 3 deviates to one side, the pulley body 5 is immediately angularly moved so that it is inclined with a level difference with respect to the direction of load on the shaft member 11 and is positioned obliquely relative to the drive belt 3, thereby producing a force of returning the drive belt 3 to its normal position.

7 Claims, 7 Drawing Sheets

U.S. PATENT DOCUMENTS

| | | | |
|---|---|---|---|
| 4,747,810 A * | 5/1988 | Shepley et al. | 474/135 |
| 5,180,342 A * | 1/1993 | Van Ee | 474/123 |
| 5,244,435 A | 9/1993 | Billett | |
| 5,427,581 A * | 6/1995 | McGrath et al. | 474/101 |
| 6,000,531 A * | 12/1999 | Martin | 198/835 |
| 6,125,712 A * | 10/2000 | Kaburagi et al. | 74/421 R |
| 6,406,392 B1 * | 6/2002 | Luh | 474/117 |
| 6,811,506 B2 * | 11/2004 | Douse et al. | 474/199 |

* cited by examiner

DRIVE BELT PULLEY AND BELT DRIVE SYSTEM

CROSS-REFERENCES TO RELATED APPLICATIONS

This application claims priority under 35 USC 119 to Japanese Patent Applications No. 2003-335697 filed on Sep. 26, 2003 and No. 2004-058632 filed on Mar. 3, 2004, the entire contents of both of which are incorporated herein by reference.

BACKGROUND OF THE INVENTION (a) Field of the Invention

This invention relates to drive belt pulleys and belt drive systems.

(b) Description of the Related Art

In drive systems using a flat belt, the flat belt when running often causes wobbling and sidetracking towards one side of the pulley. This is because a flat belt is susceptible, as compared with the other kinds of drive belts, to position changes of drive system components, such as deviation of a pulley shaft from its normal position, deflection thereof due to change in load thereon, and pulley wobbling. If such a belt wobbling or sidetracking occurs, then the flat belt may come into contact with a flange of the flat pulley, resulting in a fuzzed flat belt side face or a frayed cord.

A known approach to this problem is to crown the outer periphery of a flat pulley (i.e., to form it into a convex surface). There is also a proposed technique to form the crown at the outer periphery of a pulley into the shape of a sphere around the rotation center of the pulley (see Japanese Unexamined Utility-Model Publication No. 59-45351). This proposed pulley is intended to take the advantage of rotation moment acting on the pulley by tension of the flat belt to eliminate inclination (angular deviation) of the pulley shaft and sidetracking of the flat belt.

There is also known a flat pulley the outer periphery of which has a multiplicity of grooves formed at regular intervals along its circumference (see Japanese Unexamined Patent Publication No. 6-307521). Each groove extends to form a V-shape symmetrically from the middle of the pulley width toward both sides. These grooves create between the flat belt and the pulley a frictional force which allows the flat pulley to approach the middle of the pulley width. The frictional force prevents wobbling and sidetracking of the belt.

There is still also known a technique to place guide rollers to both sides of a flat belt and thereby limit the running position of the flat belt (see Japanese Examined Utility-Model Publication No. 63-6520).

The first-mentioned approach of crowning the pulley groove surface, however, has the following problem. When the curvature of the crown is set at a small value taking count of running stability of the flat belt (prevention of wobbling and sidetracking), stress is focused on the middle of the belt width. This prevents effective utilization of the entire belt width for power transmission and leads to early cord fatigue and degraded power transmission performance.

The above-mentioned technique of forming the pulley crown into a sphere around the rotation center of the pulley, even if it enhances the effect of preventing sidetracking of a drive belt, still has the above problem that stress is focused on the middle of the belt width by the pulley crown.

The above-described grooving of the flat pulley surface raises the production cost of the flat pulley. In addition, it is difficult to certainly prevent wobbling and sidetracking of the flat belt simply by the grooving.

When the approach is employed of limiting the running position of the flat belt by placing guide rollers or the like to both sides thereof, both sides of the flat belt always contact such a limiting member. As a result, the belt side face is likely to fuzz and the cord is likely to fray. This creates the need for applying to the flat belt a special process for preventing such adverse effects, which is a disadvantage to reduction of production cost of the flat belt.

For the above-described reasons, the fact is that though flat belt drive systems have lower loss due to belt flexing and very higher power transmission efficiency as compared with systems using other types of belts, such as V-belts, they are not exploited enough.

SUMMARY OF THE INVENTION

With the foregoing in mind, the present invention aims at enabling certain prevention of wobbling and sidetracking of flat belts or other drive belts and in turn at effective utilization of belt drive systems for various kinds of industrial machines and other equipment.

According to the present invention, sidetracking and wobbling of a drive belt are prevented by changing the attitude of a pulley appropriately using the phenomenon that the center of load on a pulley shaft changes when the drive belt deviates to one side of the pulley.

More specifically, a drive belt pulley of the present invention comprises: a hollow cylindrical pulley body around which a drive belt is to be wrapped; a hollow cylindrical shaft member that rotatably carries the pulley body; and a support member that is inserted in the shaft member and supports the shaft member and the pulley body for rocking motion about a pivot axis orthogonal to the shaft member.

Furthermore, the pivot axis is inclined forward in the direction of rotation of the pulley body with respect to the direction of load on the shaft member when viewed along the axial direction of the pulley, and the angle of inclination of the pivot axis is set at an angle from 0 to 90 degrees both exclusive.

According to this drive belt pulley, when the drive belt deviates to one side on the pulley body so that the center of load on the shaft member (shaft load) also deviates from the line passing the pivot axis to one side of the shaft member in the width direction of the pulley body, the deviated load brings rotation moment about the pivot axis to the shaft member. The shaft member is, together with the pulley body, angularly moved about the pivot axis by the rotation moment.

When the angle of inclination of the pivot axis is 90 degrees, i.e., when the pivot axis is orthogonal to the direction of load on the shaft member, the pulley body is angularly moved so that the side thereof toward which the drive belt has deviated moves toward the direction of load on the shaft member. To be specific, the pulley body is inclined so that when its working surface height is viewed with respect to the direction of load on the shaft member, the side thereof toward which the drive belt has deviated is lower and the opposite side is higher. In other words, the outer periphery of the pulley body is inclined like the case where it is crowned. The drive belt thus receives a return force opposite to the direction of its deviation. As a result, the drive belt runs at a position where equilibrium is established between the return force due to the inclination of the pulley body and a deviation force acting on the drive belt according to the characteristics of the belt drive system. Even if the drive belt largely deviates to one side, it is immediately returned to the position where equilibrium is established between the return force and the deviation force.

When the angle of inclination of the pivot axis is below 90 degrees, not only a component of force in the direction of load on the shaft member but also a component of force in the forward/backward direction of the drive belt orthogonal to the direction of load on the shaft member (the direction in which the drive belt travels while contacting the pulley body) are applied to the angular movement of the pulley body on deviation of the drive belt. Therefore, the pulley body is not only inclined relative to the direction of load on the shaft member but also contacts obliquely with the drive belt.

Since the pivot axis is inclined forward in the direction of rotation of the pulley body with respect to the direction of load on the shaft member, or in other words inclined backward in the direction of belt travel with respect to the direction of load on the shaft member, when the drive belt deviates to one side, the pulley body assumes an oblique position that the side thereof toward which the drive belt has deviated is the forward side in the direction of belt travel. When the pulley rotates at the oblique position, a force in the direction to compensate for the deviation is applied from the pulley body to the drive belt.

After all, at an angle of inclination of the pivot axis from 0 to 90 degrees both exclusive, when the drive belt deviates to one side, the drive belt pulley receives both a return force resulting from the pulley body being inclined to have a level difference with respect to the direction of load on the shaft member and a return force resulting from the pulley body assuming an oblique position relative to the drive belt. The drive belt runs at a position where equilibrium is established between a resultant of both the return forces and a deviation force acting on the drive belt according to the characteristics of the belt drive system.

Out of both the return force due to the pulley body being inclined and the return force due to the pulley body assuming an oblique position, the latter has a greater effect of preventing sidetracking.

Therefore, the angle of inclination of the pivot axis is preferably set at an angle from 0 to 90 degrees both exclusive, more preferably set at an angle from 0 degrees exclusive to 45 degrees inclusive in order to effectively use the return force due to the pulley body assuming an oblique position. When the angle of inclination is in the vicinity of 0 degrees, rotation moment about the pivot axis is less likely to occur. Therefore, still more preferably, the angle of inclination is set at an angle from 5 to 45 degrees both inclusive, or from 10 to 30 degrees both inclusive.

As can be seen from the above, the pulley of the present invention can immediately and certainly eliminate sidetracking and wobbling of a drive belt with a simple structure.

This allows a flat pulley to have a gentle crown and enables even the use of a flat pulley with no crown. In other words, the designing of a pulley can be facilitated. At the same time, the tension distribution of a cord of a drive belt can be uniformed and stabilized, which is advantageous in improvement in durability and power transmission performance of the drive belt.

In another drive belt pulley of the present invention, the pivot axis is disposed to intersect the direction of load on the shaft member, and when the drive belt deviates to one side on the pulley body, moment about the pivot axis generates due to load applied to the shaft member so that the pulley body assumes a position oblique toward the other side of the pulley body relative to the drive belt.

Thus, when the drive belt deviates to one side on the pulley body, rotation moment about the pivot axis generates so that the pulley body assumes, together with the shaft member, a position oblique relative to the drive belt. As a result, a force of compensating for deviation of the drive belt acts on the drive belt from the pulley body. Furthermore, when the pulley body assumes a position oblique relative to the drive belt, the pulley body is concurrently inclined to have a level difference with respect to the direction of load on the shaft member. This inclination of the pulley body brings a return force to the drive belt. Finally, the drive belt runs at a position where equilibrium is established between the return force and the deviation force.

Consequently, the above pulley can immediately and certainly eliminate sidetracking and wobbling of a drive belt with a simple structure.

Still another drive belt pulley of the present invention comprises: a hollow cylindrical pulley body around which a drive belt is to be wrapped; a hollow cylindrical shaft member that rotatably carries the pulley body; and a support member that is inserted in the shaft member and supports the shaft member and the pulley body for rocking motion about a pivot axis orthogonal to the shaft member.

When this drive belt pulley is used by inclining the pivot axis forward in the direction of rotation of the pulley body with respect to the direction of load on the shaft member and at an angle from 0 to 90 degrees both exclusive, even if the drive belt has deviated to one side, the deviation can be prevented from being increased. Therefore, this pulley can immediately and certainly eliminate sidetracking and wobbling of the drive belt.

Still another drive belt pulley of the present invention comprises: a pulley body around which a drive belt is to be wrapped; and a support member that supports the pulley body for rotation about a rotational axis and rocking motion about a pivot axis orthogonal to the rotational axis.

Furthermore, the pivot axis is inclined forward in the direction of rotation of the pulley body with respect to the direction of load on the pulley body when viewed along the axial direction of the pulley body, and the angle of inclination of the pivot axis is set at an angle from 0 to 90 degrees both exclusive.

Therefore, when the drive belt deviates to one side on the pulley body so that the center of load on the pulley body moves in the direction of rotational axis of the pulley body, moment about the pivot axis generates so that the pulley body moves angularly (i.e., the rotational axis moves angularly about the pivot axis). A return force of compensating for the deviation thus acts on the drive belt from the pulley body. As a result, the drive belt runs at a position where equilibrium is established between the return force and the deviation force.

Preferably, the pivot axis of the drive belt pulley is disposed approximately in the middle of the width of the pulley body. This is advantageous in running the drive belt while positioning it approximately in the middle of the width of the pulley body.

It is preferable that the support member comprises a support rod inserted in the hollow cylindrical shaft member and a pin forming the pivot axis, and the inner wall of the shaft member and the support rod are formed with associated flat surfaces orthogonal to the pin and slidably contacting with each other due to load applied to the shaft member.

Since the shaft member and the support rod slidably contact with each other by tension of the drive belt, the contact brings resistance against rocking motion to the shaft member. As a result, it can be prevented that the pulley body improperly rocks by vibration of the running drive belt, and that when the drive belt deviates to one side, the pulley body causes quick wiggly oscillation, i.e., hunting.

The inner wall of the shaft member is preferably formed with a flat surface orthogonal to the pivot axis, and the support member preferably comprises: a support rod that is inserted in the hollow cylindrical shaft member and is formed with a flat surface slidably contacting with the flat surface of the shaft member by load applied to the shaft member; and a hemisphere interposed between the flat surface of the support rod and the flat surface of the shaft member to form the pivot axis.

Since the pivot axis is formed of a hemisphere, it can exhibit the same function as the pin and increases the strength as compared with the pin. In addition, the support rod has an increased strength as compared with the case where the pivot axis is formed by passing the pin through the support rod.

A belt drive system of the present invention is a system in which the drive belt pulley as described above is pushed against a drive belt to apply tension to the drive belt.

Therefore, the belt drive system can prevent wobbling and sidetracking of the drive belt while applying a stable tension to the drive belt, which is advantageous in bringing out a full power transmission performance of the drive belt.

Drive belts of the present invention include all types of belts such as flat belts and synchronous belts (timing belts). For flat belts, either of their inner face (working face) and outer face (back face) may be contacted with a pulley body. For synchronous belts, their outer face (back face) is preferably contacted with a pulley body.

DESCRIPTION OF THE PREFERRED EMBODIMENTS

Hereinafter, an embodiment of the present invention will be described in detail with reference to the drawings.

Figure 1:
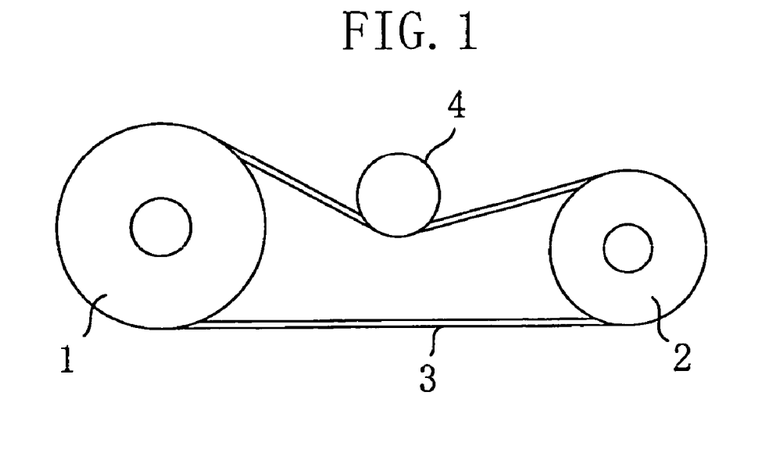
FIG. 1 is a side view of a belt drive system according to the present invention.

In a belt drive system shown in FIG. 1, reference numeral 1 denotes a drive pulley (flat pulley), and reference numeral 2 denotes a driven pulley (flat pulley). A drive belt (flat belt) 3 is wrapped around both the pulleys 1 and 2. A drive belt pulley 4 is pushed against the back face of the drive belt 3, thereby applying tension to the drive belt 3.

Figure 2:
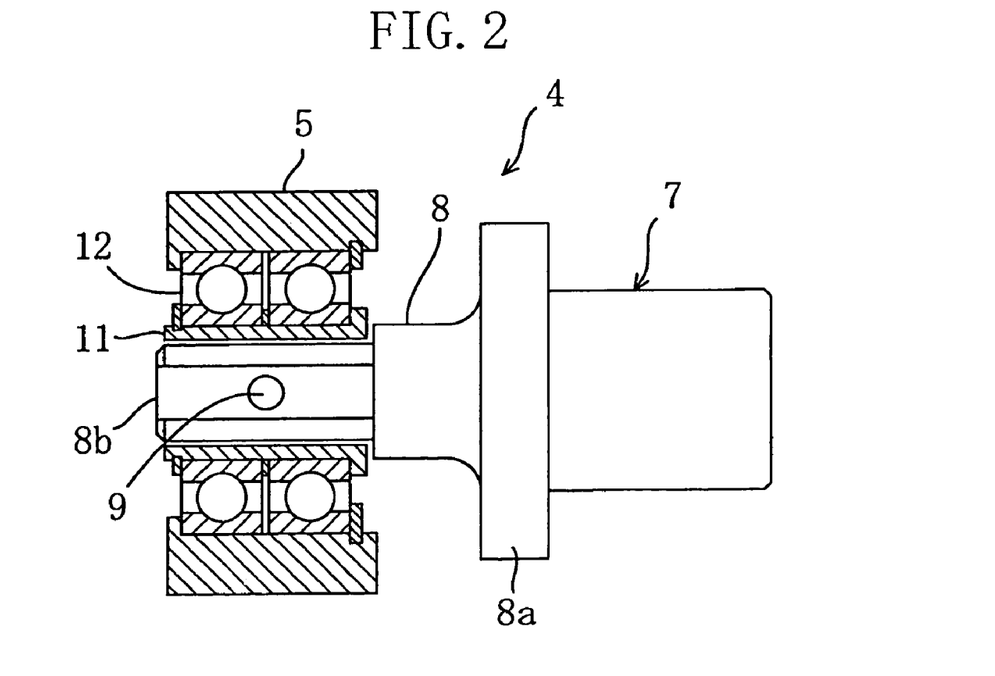
FIG. 2 is a partly sectional side view showing a drive belt pulley according to the present invention.

As shown in FIG. 2, the pulley 4 has a hollow cylindrical pulley body 5 around which the drive belt 3 is to be wrapped, a hollow cylindrical shaft member 11 that rotatably carries the pulley body 5 via bearings 12, and a support member 7 that supports the pulley body 5 and the shaft member 11 both for rocking motion. The support member 7 is provided with a support rod 8 and a pin 9.

Figure 3:
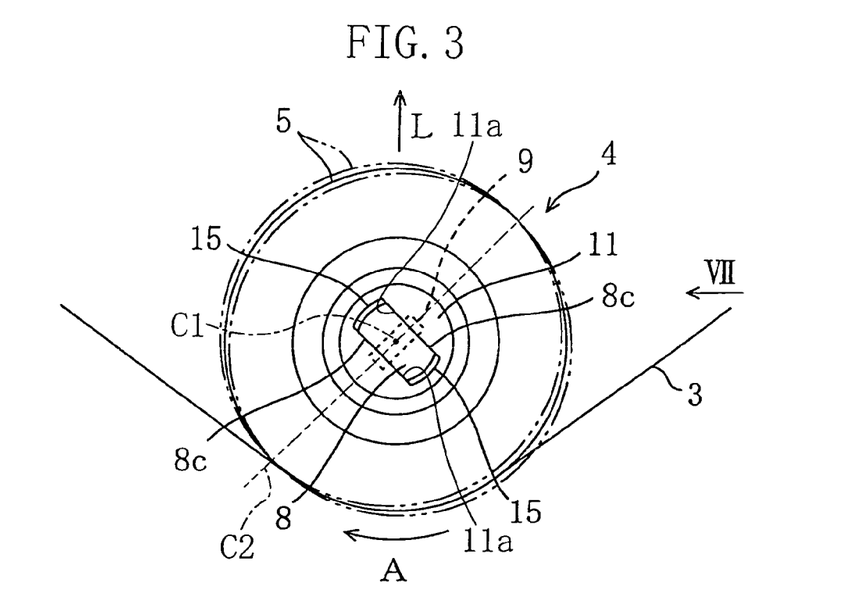
FIG. 3 is a front view showing the state of use of the drive belt pulley.
Figure 4:
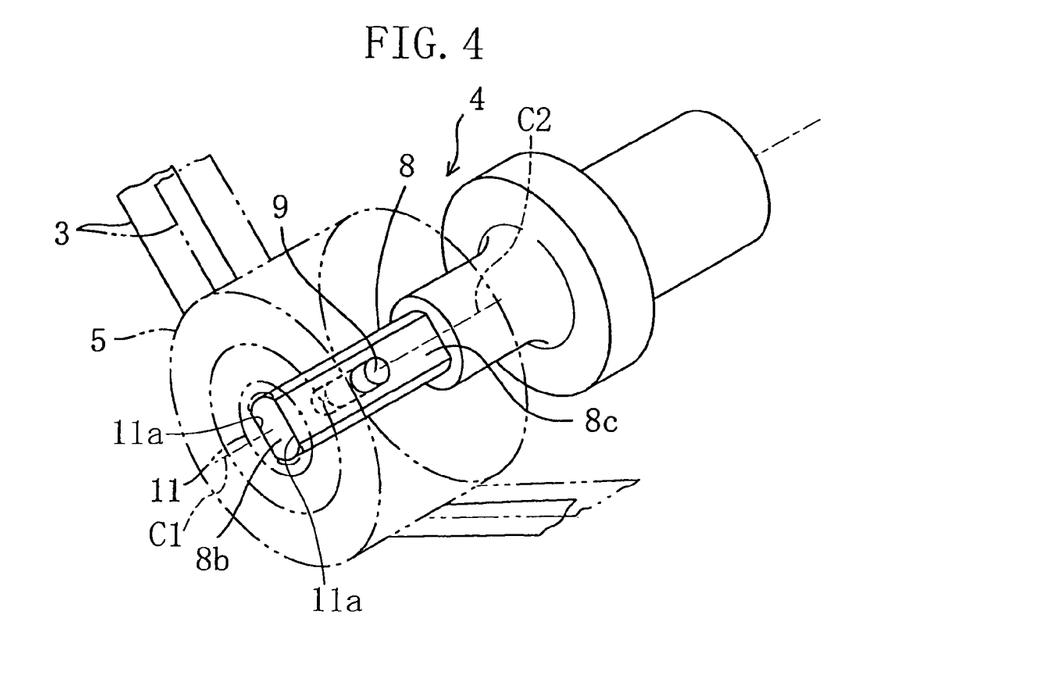
FIG. 4 is a perspective view showing the state of use of the drive belt pulley.

The support rod 8 consists of an attachment part 8a and a supporting part 8b continued from one end of the attachment part 8a. The attachment part 8a is attached to a support, such as a housing, in which the belt drive system is disposed. The supporting part 8b is inserted into the hole of the hollow cylindrical shaft member 11. The supporting part 8b is formed by cutting diametrically opposite D-shaped portions of a rod of circular section. This cutting of D-shaped portions creates parallel extending, flat sliding surfaces 8c and 8c on the supporting part 8b as shown in FIGS. 3 and 4.

Therefore, the supporting part 8b has opposite flat sliding surfaces 8c and 8c, and arcuate surfaces located on both sides to connect corresponding edges of the sliding surfaces 8c and 8c, thereby forming a substantially rectangular section.

The hole of the shaft member 11 is also formed in a substantially rectangular section according to the sectional shape of the supporting part 8b of the support rod 8. To be specific, the inner wall of the shaft member 11 is formed with opposite flat sliding surfaces 11a and 11a with which the respective sliding surfaces 8c and 8c of the support rod 8 contact slidably. In addition, the inner wall of the shaft member 11 is formed with arcuate surfaces located on both sides to connect corresponding edges of the sliding surfaces 11a and 11a.

The pin 9 of the support member 7 is fitted in a through hole formed in the supporting part 8b of the support rod 8. Both ends of the pin 9 are seated in support holes formed in the shaft member 11. The pin 9 is placed approximately in the middle of the width of the pulley body 5 and intersects at right angles with the sliding surfaces 8c and 8c of the support rod 8.

Furthermore, gaps 15 and 15 are left between the arcuate surfaces at both sides of the supporting part 8b of the support rod 8 and the corresponding arcuate surfaces at both sides of the hole of the shaft member 11. The gaps 15 and 15 allow the shaft member 11 to rock about the pin 9 together with the pulley body 5. In this manner, the pulley body 5 is supported for rotation about a rotational axis C1 and rocking motion about a pivot axis C2 orthogonal to the rotational axis C1.

Figure 8:
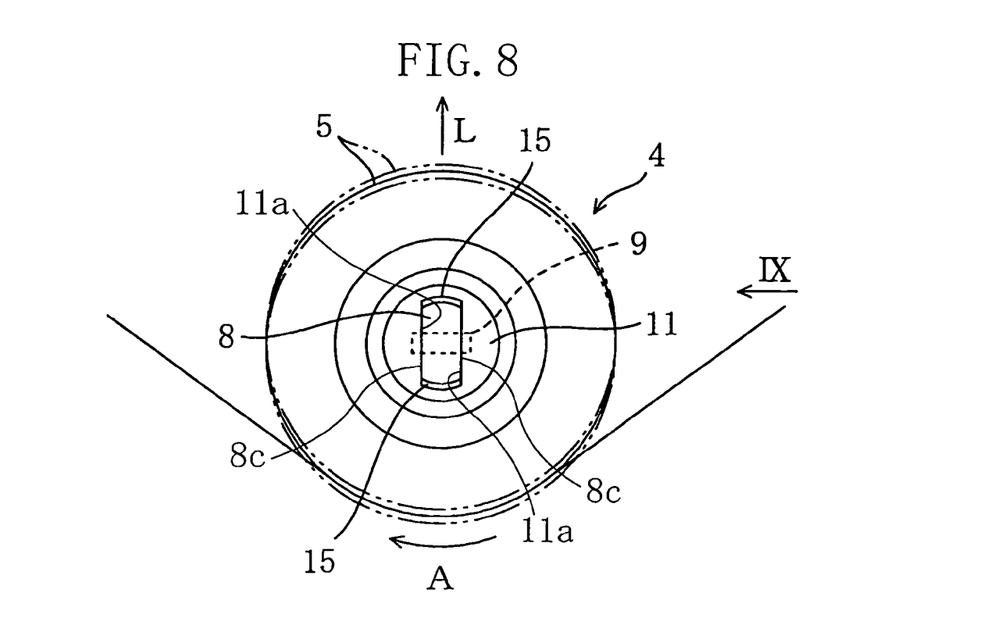
FIG. 8 is a front view showing another state of use of the pulley.

The drive belt pulley 4 is used in a state where the pin 9 is inclined backward in the direction of belt travel A with respect to the direction of load (the load on the shaft member 11 due to tension of the drive belt) L as shown in FIG. 3, or in a state where the pin 9 is orthogonal to the direction of load L as shown in FIG. 8.

In the state of use shown in FIG. 3, assumed that, as shown in the dot-dashed lines in FIG. 4, the drive belt 3 positioned approximately in the middle of the width of the pulley body 5 moves from that position to one side. At the time, the center of load on the shaft member 11 deviates from the line passing the pin 9 to one side of the pulley body 5. As a result, rotation moment about the pin 9 acts on the shaft member 11, so that the shaft member 11 is, together with the pulley body 5, angularly moved about the pin 9.

Figure 5:
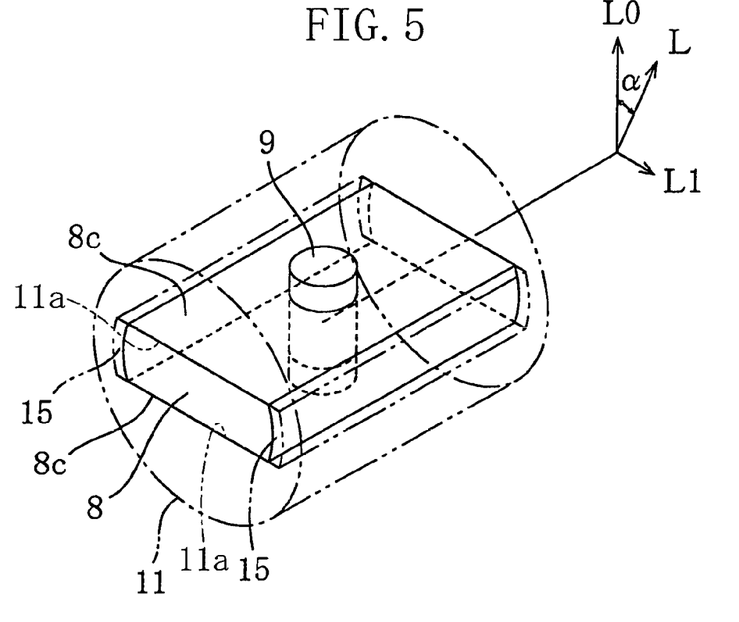
FIG. 5 is a diagram illustrating the fact that in the above state of use of the pulley, rotation moment arises on a shaft member due to load applied thereon.

FIG. 5 shows the supporting part 8b, the pin 9 and the shaft member 11 of the support rod 8. When the direction of load on the shaft member 11 is the same as that of the pin 9 (i.e., Lo), no rotation moment about the pin 9 generates. On the other hand, when the direction of load on the shaft member 11 is the direction L inclined at an angle of α with respect to the direction of the pin 9, its component of force L1 creates rotation moment about the pin 9. The rotation moment angularly moves the shaft member 11. The angle α corresponds to the angle of inclination of the pin 9 with respect to the direction of load L.

Figure 6:
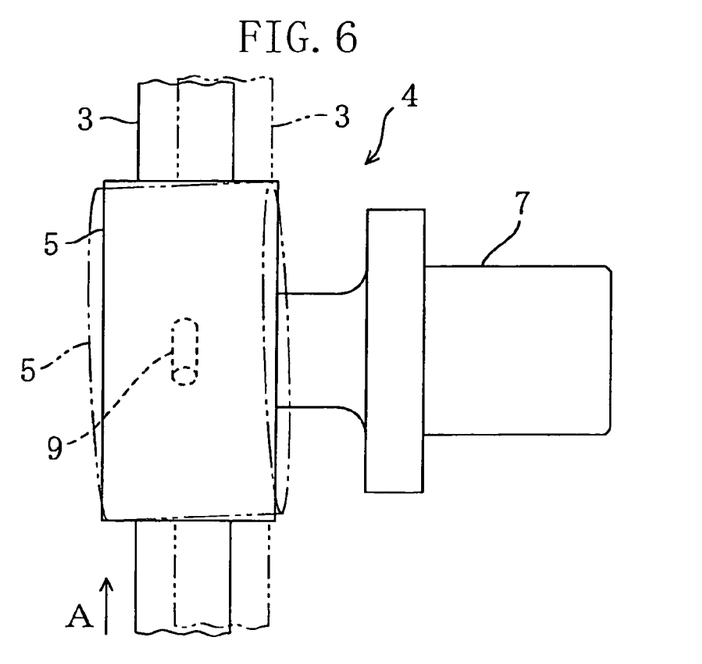
FIG. 6 is a plan view showing an angular movement of a pulley body when the drive belt has deviated to one side in the above state of use.
Figure 7:
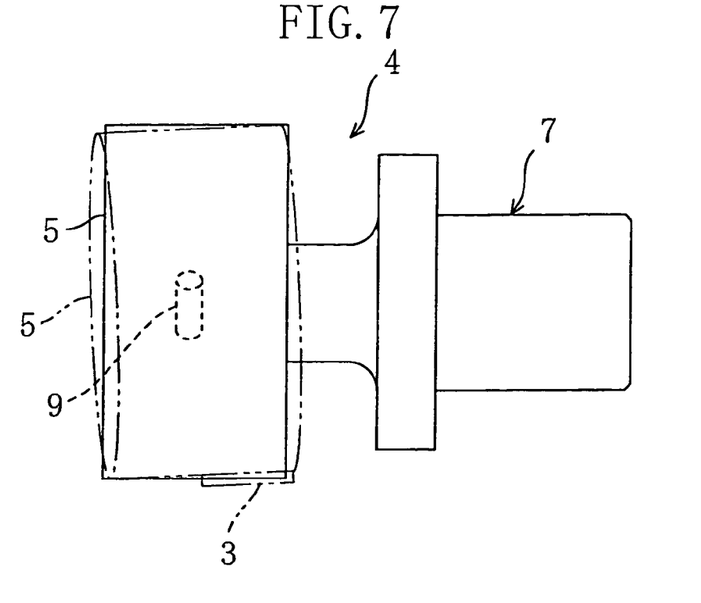
FIG. 7 is a side view taken in the direction of arrow VII of FIG. 3.

Thus, in the case of FIGS. 3 and 4, the load L angularly moves the pulley body 5 about the inclined pin 9. As a result, the pulley body 5, as shown in FIG. 6 (plan view), assumes a position oblique relative to the drive belt 3 so that the side of the pulley body 5 toward which the drive belt 3 has deviated is the forward side in the direction of belt travel. Concurrently, as shown in FIG. 7 (side view taken in the direction of arrow VII of FIG. 3), the pulley body 5 is inclined relative to the direction of load L so that the side thereof toward which the drive belt 3 has deviated is lower and the opposite side is higher. FIGS. 3, 6 and 7 show by the dot-dashed lines the position of the pulley body 5 after its angularly movement.

Therefore, the drive belt 3 receives a return force (force of compensating for its deviation) resulting from the pulley body 5 assuming the oblique position, and a return force resulting from the pulley body 5 being inclined. In this manner, the drive belt 3 is prevented from being sidetracked. In other words, the drive belt 3 runs at its position where equilibrium is established between a return force resulting from that the pulley body 5 assumes the oblique position and is inclined and a deviation force acting on the drive belt 3 according to the characteristics of the belt drive system. Even if the drive belt 3 largely deviates to one side, the drive belt 3 will be returned to the position where equilibrium is established between the return force and the deviation force.

Furthermore, when the pin 9 is inclined as described above, the sliding surface 8c of the support rod 8 comes into contact with the sliding surface 11a of the hollow cylindrical shaft member 11 because of load on the shaft member 11. Therefore, an adequate sliding resistance acts between both the sliding surfaces 8c and 11a. As a result, it is prevented that when the drive belt 3 runs in the vicinity of the middle of the pulley body 5, the pulley body 5 slightly rocks by running vibration or the like of the drive belt 3. At the same time, it is also prevented that when the drive belt 3 deviates to one side, the pulley body 5 sensitively responds to move angularly and the pulley body 5 thereby causes quick wiggly oscillation, i.e., hunting.

Figure 9:
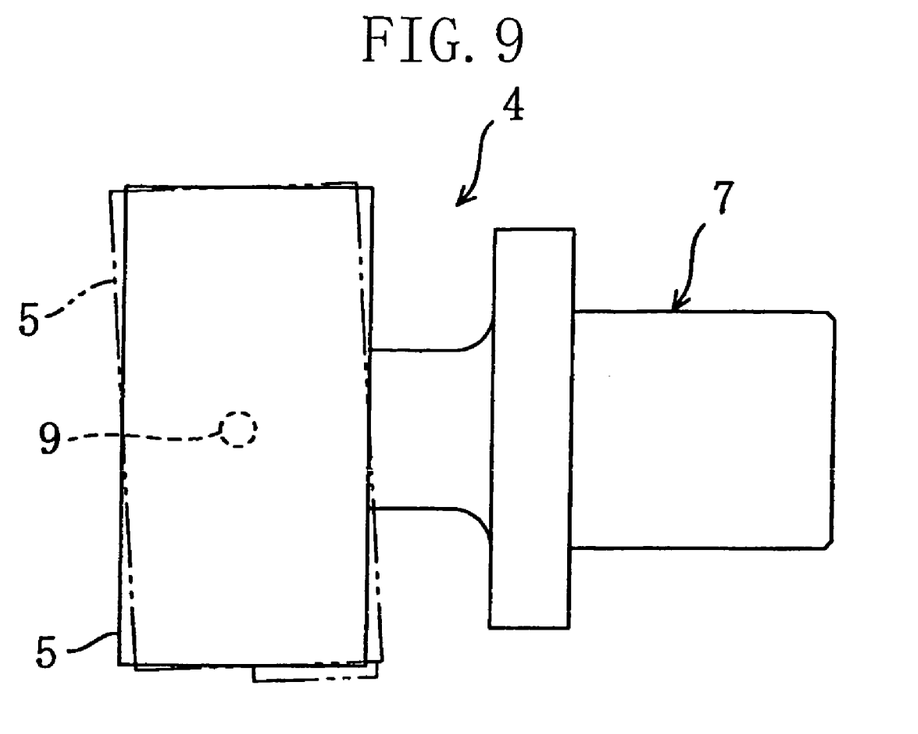
FIG. 9 is a side view taken in the direction of arrow IX of FIG. 8.

In the state of use shown in FIG. 8, when the drive belt 3 deviates to one side of the pulley body 5, the pulley body 5 angularly moves, together with the shaft member 11, about the pin 9 orthogonal to the load on the shaft member 11 as shown in FIG. 9 (side view taken in the direction of arrow IX of FIG. 8). As a result, the pulley body 5 is inclined relative to the direction of load L so that the side thereof toward which the drive belt 3 has deviated is lower and the opposite side is higher.

Therefore, the drive belt 3 receives a return force resulting from the pulley body 5 being inclined. In this manner, the drive belt 3 is prevented from being sidetracked. In other words, the drive belt 3 runs at its position where equilibrium is established between the return force resulting from the pulley body 5 being inclined and the deviation force acting on the drive belt 3 according to the characteristics of the belt drive system. Even if the drive belt 3 largely deviates to one side, the drive belt 3 will be returned to the position where equilibrium is established between the return force and the deviation force.

When the pulley 4 is used as a tension pulley as described above, a stable tension can be applied to the drive belt 3, which is advantageous in bringing out a full power transmission performance of the drive belt 3.

The outer periphery of the pulley body 5 may be crowned gently. If the crown on the pulley body 5 is gentle, the drive belt 3 can avoid application of a large load thereon.

The pulley body 5 may be provided at both side edges with flanges to prevent the drive belt 3 from dropping out of the pulley body 5 when an abnormal external force is applied to the drive belt 3. Since, as described above, sidetracking and wobbling of the drive belt 3 can be prevented by angular movement of the pulley body, the drive pulley hardly contacts with the flanges. Therefore, there occurs neither fuzzing of the side face of the drive belt 3 nor fraying of the cord.

In the present embodiment, the pulley 4 is used as a tension pulley. The pulley of the present invention, however, can be used for other purposes of a drive system, such as adjustment of the length or contact angle of a drive belt, or change of the direction of belt travel.

MODIFICATION

Figure 10:
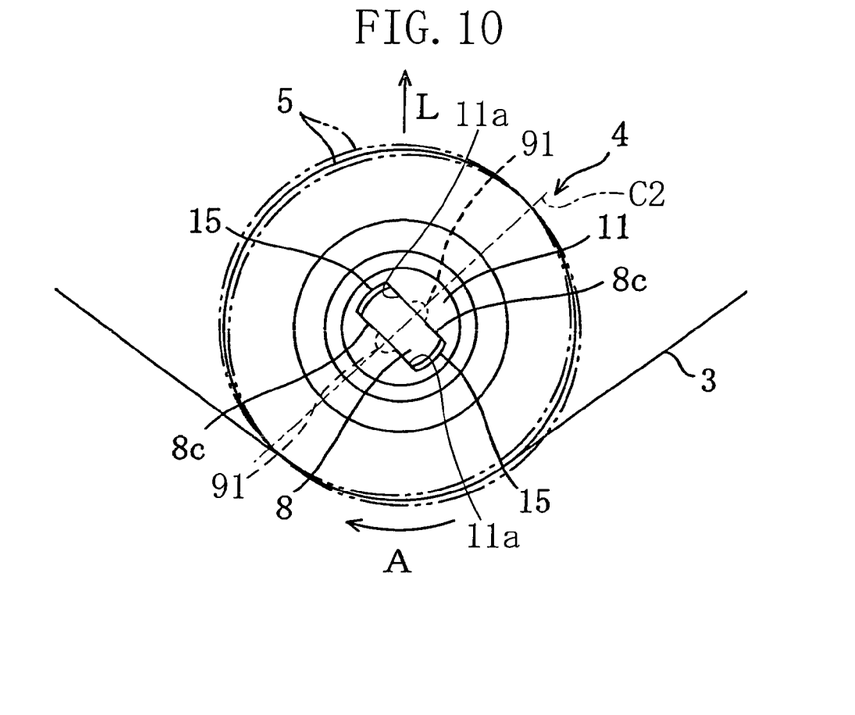
FIG. 10 is a diagram showing a pulley according to a modification, corresponding to FIG. 3.
Figure 11:
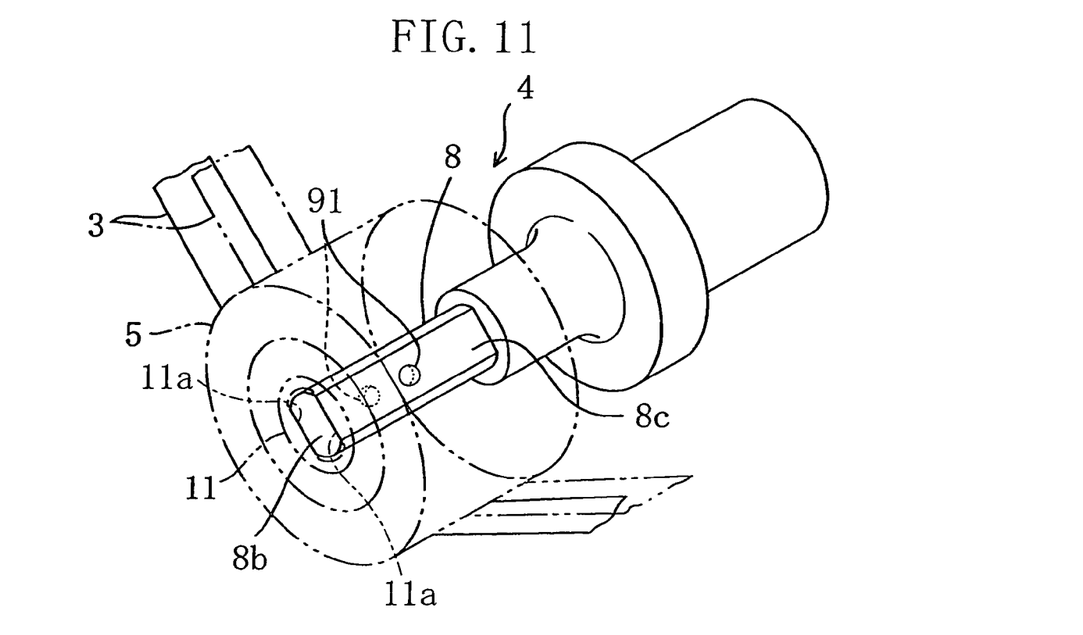
FIG. 11 is a diagram showing the pulley of FIG. 10, corresponding to FIG. 4.

In the above embodiment, the pivot axis C2 is formed of the pin 9 fitted in the through hole formed in the support rod 8. The pivot axis C2, however, as shown in FIGS. 10 and 11, may be formed of hemispherical projections (hemispheres) 91 and 91 which are formed integrally with the two sliding surfaces 8c and 8c of the support rod 8, respectively, to protrude from the sliding surfaces 8c and 8c.

Figure 12:
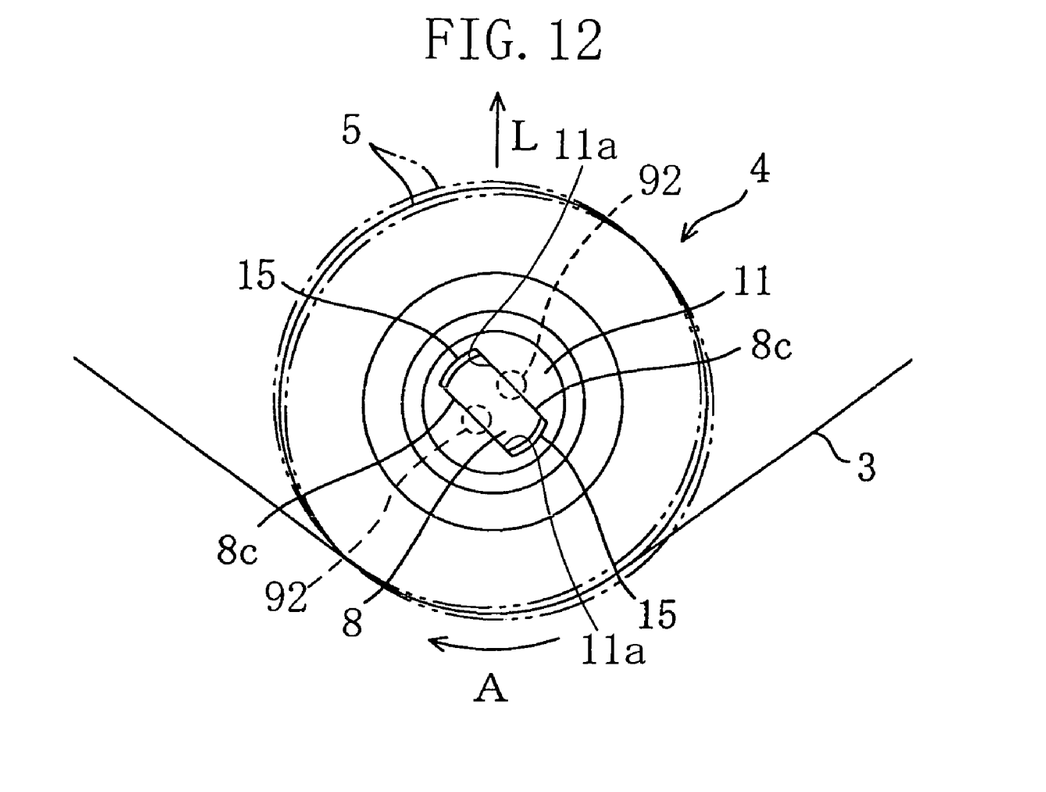
FIG. 12 is a diagram showing a pulley having a different pivot configuration from that of FIG. 10.

Alternatively, as shown in FIG. 12, the hemispheres protruding from the sliding surfaces 8c and 8c may be formed by fitting spheres 92 and 92 into recesses formed in the sliding surfaces 8c and 8c, respectively.

When the pivot axis C2 is formed of hemispheres 91 or 92, it can not only obtain the same function as that formed of the pin 9, but also increase its strength. Therefore, it has the advantage of increasing the bearing strengths of the shaft member 11 and the pulley body 5.

Furthermore, since no through hole is formed in the support rod 8, the strength of the support rod 8 can be increased. Though not shown, other structures with no through hole formed in the support rod 8 can be implemented, for example, by forming cylindrical projections protruding from the two sliding surfaces 8c and 8c of the support rod 8, respectively, or by fitting cylindrical pins into recesses formed in the sliding surfaces 8c and 8c, respectively.

The hemispheres 91 or 92 or the cylindrical pins may be provided on the shaft member 11, instead of the support rod 8.

What is claimed is:

1. A drive belt pulley comprising:
   a hollow cylindrical pulley body around which a drive belt is to be wrapped;
   a hollow cylindrical shaft member that rotatably carries the pulley body;
   and
   a support member that is inserted in the shaft member and supports the shaft member and the pulley body for rocking motion about a pivot axis orthogonal to the shaft member,
   wherein the pivot axis is inclined forward in the direction of rotation of the pulley body with respect to the direction of load on the shaft member when viewed along the rotational axis of the pulley body, and
   wherein the angle of inclination of the pivot axis is non-rotatingly set at an angle between 0-90 degrees exclusively.

2. The pulley of claim 1, wherein the pivot axis is disposed approximately in the middle of the width of the pulley body.

3. The pulley of claim 1,
wherein the support member comprises a support rod inserted in the hollow cylindrical shaft member and a pin forming the pivot axis, and
wherein the inner wall of the shaft member and the support rod are formed with associated flat surfaces orthogonal to the pin and slidably contacting with each other due to load applied to the shaft member.

4. The pulley of claim 1,
wherein the inner wall of the shaft member is formed with a flat surface orthogonal to the pivot axis, and
wherein the support member comprises:
a support rod that is inserted in the hollow cylindrical shaft member and is formed with a flat surface slidably contacting with the flat surface of the shaft member by load applied to the shaft member; and
a hemisphere interposed between the flat surface of the support rod and the flat surface of the shaft member to form the pivot axis.

5. A belt drive system in which the drive belt pulley of claim 1 is pushed against a drive belt to apply tension to the drive belt.

6. A drive belt pulley comprising:
a hollow cylindrical pulley body around which a drive belt is to be wrapped;
a hollow cylindrical shaft member that rotatably carries the pulley body;
and
a support member that is inserted in the shaft member and supports the shaft member and the pulley body for rocking motion about a non-rotating pivot axis orthogonal to the shaft member,
wherein the pivot axis is disposed to intersect the direction of load on the shaft member, and
wherein when the drive belt deviates to one side on the pulley body, moment about the pivot axis generates due to load applied to the shaft member and the pulley body assumes a oblique position relative to the drive belt.

7. A drive belt pulley comprising:
a pulley body around which a drive belt is to be wrapped; and
a support member that supports the pulley body for rotation about a rotational axis and rocking motion about a pivot axis orthogonal to the rotational axis,
wherein the pivot axis is non-rotating and inclined forward in the direction of rotation of the pulley body with respect to the direction of load on the pulley body when viewed along the rotational axis of the pulley body, and
wherein the angle of inclination of the pivot axis is set at an angle between 0-90 degrees exclusively.

* * * * *